United States Patent [19]

F'Geppert

[11] Patent Number: 4,678,224
[45] Date of Patent: Jul. 7, 1987

[54] PREVENTION OF PARTICULATE ACCUMULATIONS ON OBSERVATION WINDOWS IN MILITARY VEHICLES

[76] Inventor: Erwin F'Geppert, 27563 Meadowbrook, Novi, Mich. 48050

[21] Appl. No.: 730,413

[22] Filed: May 6, 1985

[51] Int. Cl.$^4$ ............................................. B60J 1/20
[52] U.S. Cl. ........................................ 296/91; 15/313; 89/36.14
[58] Field of Search ................. 296/91, 84 R; 15/313, 15/250 R; 89/36.14, 36.13

[56] References Cited

U.S. PATENT DOCUMENTS

| | | | |
|---|---|---|---|
| 1,448,508 | 3/1923 | Thum | 15/313 X |
| 2,022,833 | 12/1935 | Welch | 296/91 |
| 2,223,378 | 12/1940 | Martin | 296/91 |
| 2,243,029 | 5/1941 | Cupit | 296/91 |
| 2,367,426 | 1/1945 | Patterson | 296/91 |
| 3,724,323 | 4/1973 | Selle | 89/36.14 |

FOREIGN PATENT DOCUMENTS 39942  4/1981  Japan ...................... 15/313

Primary Examiner—Deborah L. Kyle
Assistant Examiner—John S. Maples

[57] ABSTRACT

In a military vehicle having small observation windows susceptible to being coated with airborne mud particles when the vehicle is operating off-the-road under adverse climate conditions, it is proposed to provide air pressure mechanisms on the vehicle near the window surfaces. Such air pressure mechanisms are oriented to generate an air curtain in the space between airborne particulates and the window surface, whereby the curtain acts to deflect such particulates away from the window surface.

1 Claim, 5 Drawing Figures

PREVENTION OF PARTICULATE ACCUMULATIONS ON OBSERVATION WINDOWS IN MILITARY VEHICLES

GOVERNMENT INTEREST

The invention described herein may be manufactured, used, and licensed by or for the Government for governmental purposes without payment to me of any royalty thereon.

BACKGROUND AND SUMMARY OF THE INVENTION

This invention relates to mechanisms for preventing particulate build-ups on external surfaces of viewing windows on military vehicles, e.g., tanks and personnel carriers.

Military vehicles commonly include armored hulls having endless ground-engagement tracks. When the vehicles are operating in muddy terrain the tracks tend to throw up considerable mud and/or water. Depending on specific conditions, the atmosphere in near proximity to the vehicle can have airborne particulates therein sufficient to present a visibility problem. Of special concern are relatively small particles that tend to remain suspended in the air for more than a second or two. Should the zone in front of a moving vehicle have a significant number of airborne particulates therein the moving vehicle can run into the airborne particles, thereby causing such particles to impinge on the vehicle window surfaces. The human driver and/or commander and/or gunner using the mud-coated window surface(s) is/are thus unable to effectively use the window(s) for viewing purposes.

The extent of the viewing problem is related, in part, to the location of the window vis a vis the direction of motion of the vehicle. Forwardly-facing window surfaces are more prone to accumulate dust or mud particles thereon than window surfaces facing to the rear or to the side.

The viewing windows can be located in the hull and/or on a gun turret carried atop the hull. In some cases the viewing windows are located on a hatch cover carried by the hull or turret. In many cases the observation windows are non-adjustable, i.e., non-movable. In other cases the observation windows are adjustable in the azimuth or elevational planes to permit an extended view of the terrain for locating, sighting or ranging enemy targets. The observation windows may be component parts of periscope devices, or component parts of vision lens systems, or component parts of television cameras, thermal imaging devices, etc.

Whatever the viewing window structure or placement on the vehicle, there is a problem in keeping the external surfaces of such window structures free of mud, snow, etc. when the vehicle is operating under adverse climatic conditions.

A common characteristic of such observation windows is their relatively small external surface area. Commonly such windows comprise vision blocks having external surface areas measuring only about four inches high and ten inches long (in a horizontal direction). Such vision blocks act in the nature of horizontal transparent slits in the armor wall structure.

The term "vision blocks" here refers to a relatively thick transparent block-like element having a relatively great thickness along the block optical axis, e.g., six inches. Such vision blocks are usually thick laminated structures having ten or more laminations to minimize destructive effects from enemy small arms fire.

Such "vision block" windows are designed to have relatively small exposed surface areas in order to present to the enemy force a target area as small as possible, consistent with their intended viewing functions. Due to the small effective surface areas of such windows the field-of-view through a given window is usually quite small or restricted. Any accumulation of dust, dirt, mud, snow, rain or sand on the window external surface can significantly interfere with viewing capability.

Some existing vehicles have motor-driven windshield wipers for selected ones of their observation windows. However, such wipers may not be practical when large numbers of vision blocks are being used, e.g., a turret having ten or more vision blocks extending around its peripheral roof area. In some cases it is difficult to get electrical power to a wiper motor at an observation window, e.g., when the window(s) is/are mounted in a movable hatch cover.

Other problems asssociated with the use of windshield wipers is their cost and their undesired bulk. When the vision block (viewing window) has a height of only about four inches the wiper blade can occupy such a large percentage of the window area as to partially obstruct the view through the window. Since the view through such windows is already limited (due to the small area sizes of such windows), any obstruction due to wiper mechanism can pose a survivability problem for vehicle personnel.

The present invention relates to low cost mechanisms for preventing particulate accumulations on the windows of military vehicles. A special object of the invention is to provide a low cost alternative to conventional windshield wipers, particularly an alternative mechanism that can be used with "small face area" windows of the "vision block" type. The invention is especially concerned with a mechanism for preventing the build-up of particulates on the external surfaces of forwardly-facing windows (i.e., surfaces that could run into airborne particulates in the vehicle's path).

The invention contemplates mechanism for creating a pressurized gas curtain in front of a vehicle window, whereby when the vehicle is moving through an atmosphere containing airborne particulates the pressurized gas curtain is effective to deflect particulates away from the window surface. The pressurized gas curtain acts as a shield or barrier between the airborne particles and the window surface.

THE DRAWINGS

Figure 1:
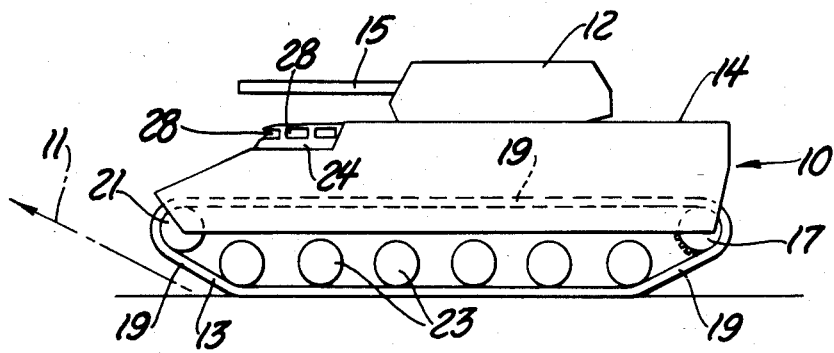
FIG. 1 is a side elevational view of a military vehicle suited to utilize my invention.

Referring in greater detail to FIG. 1, there is shown an existing military vehicle used by the U.S. military forces, and commonly known as the M2 Infantry Fighting Vehicle. The vehicle comprises a hull 10 and rotary turret 12 mounted on hull top wall 14 for adjustment in the azimuth plane to facilitate proper aiming of gun 15.

An engine within the hull drives sprockets 17 that in turn drive endless tracks 19 that are trained around front wheels 21 and roadwheels 23.

The driver of the vehicle occupies a station within the hull forwardly from turret 12 and to the left of the vehicle longitudinal centerline. He has access to the hull through a hinged hatch cover 24. When the driver is seated within the vehicle in driving position he has a view of the terrain through conventional vision blocks (windows) 28 mounted in cover 24. Each vision block forms part of a periscope structure of conventional design.

When the vehicle is operating in the presence of mud and/or rain the zone in the forward path of the vehicle can have airborne particulates therein. It is believed that such particulates result in part as a result of splash from the ground surface. As the frontal surfaces on inclined track sections 13 contact the ground surface, water and/or mud particulates are propelled upwardly and forwardly, as indicated generally by arrows 11 in FIG. 1. The smaller airborne particulates tend to remain in the path of the vehicle for at least a few seconds. During this time the vehicle can run into the airborne particles, causing at least some of such particles to impinge on the surfaces of windows 28.

The above-referenced muddy conditions can produce undesired build-up of opaque or semi-transparent particles on the surfaces of windows 28. Similar undesired build-ups can occur under other operating conditions, e.g., during snow storms, sand storms, or dust storms.

FIGS. 2 through 5 illustrate gas-curtain mechanisms that I believe will eliminate or substantially reduce the undesired build-ups on the window surfaces.

Figure 3:
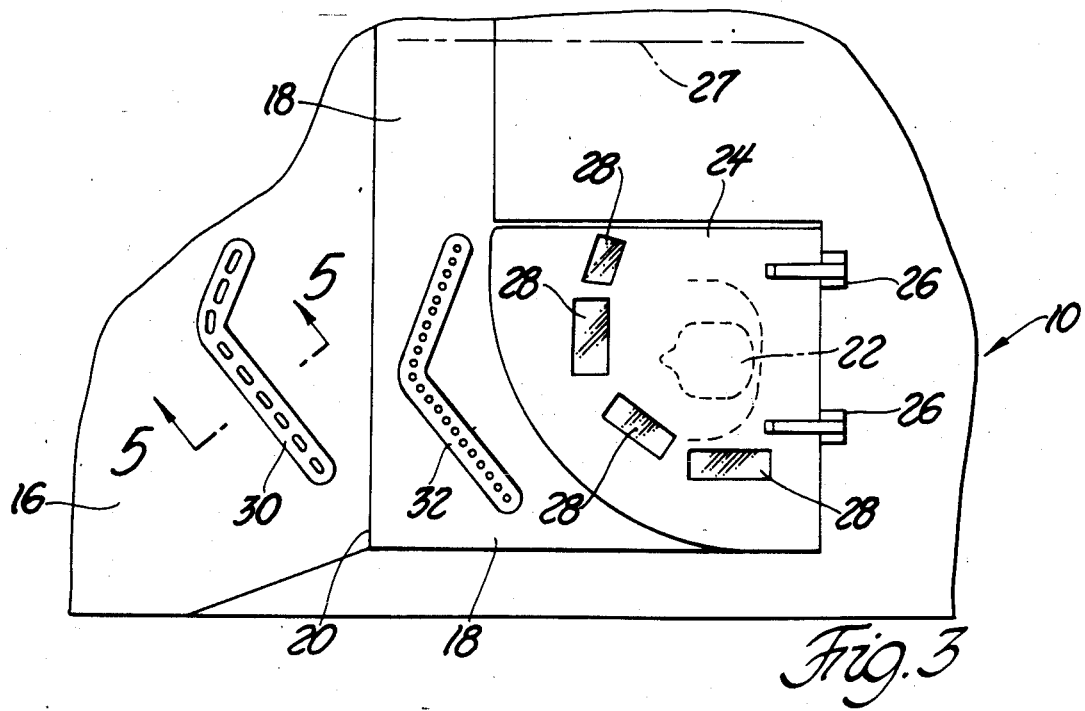
FIG. 3 is a fragmentary top plan view of the FIG. 2 structure.
Figure 4:
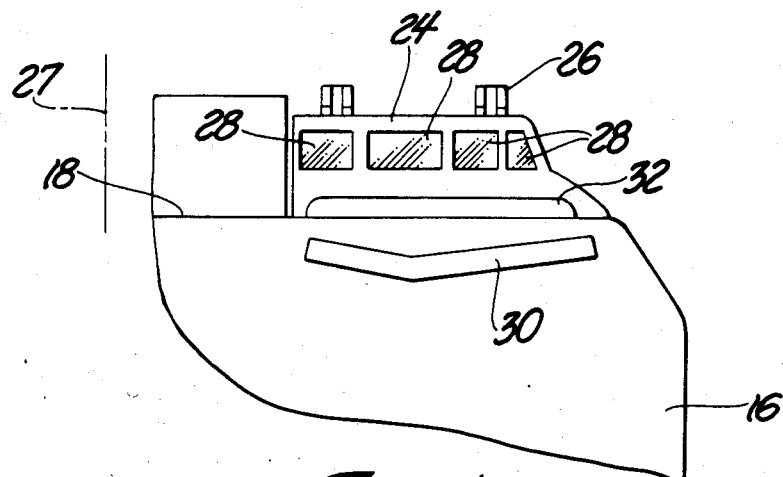
FIG. 4 is a fragmentary front elevational view of the FIG. 2 structure.

As seen in FIG. 3 there are four observation windows (vision blocks) 28 arranged in hatch cover 24 to permit human driver 22 to view terrain areas in front of the vehicle and to the left side of the vehicle. Hatch cover 24 is hingedly mounted to top wall 14 of the hull, as by means of hinges 26, such that the driver can leave the vehicle through a hatch opening in hull wall 18. The longitudinal centerline of the vehicle is designated by numeral 27.

Figure 2:
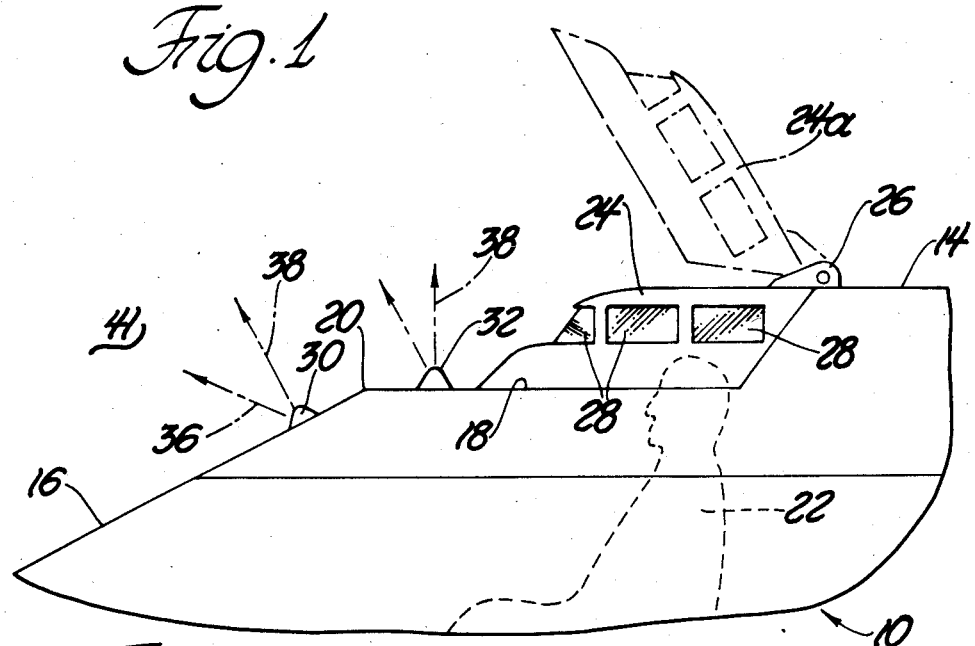
FIG. 2 is a fragmentary side elevational view of the FIG. 1 vehicle.
Figure 5:
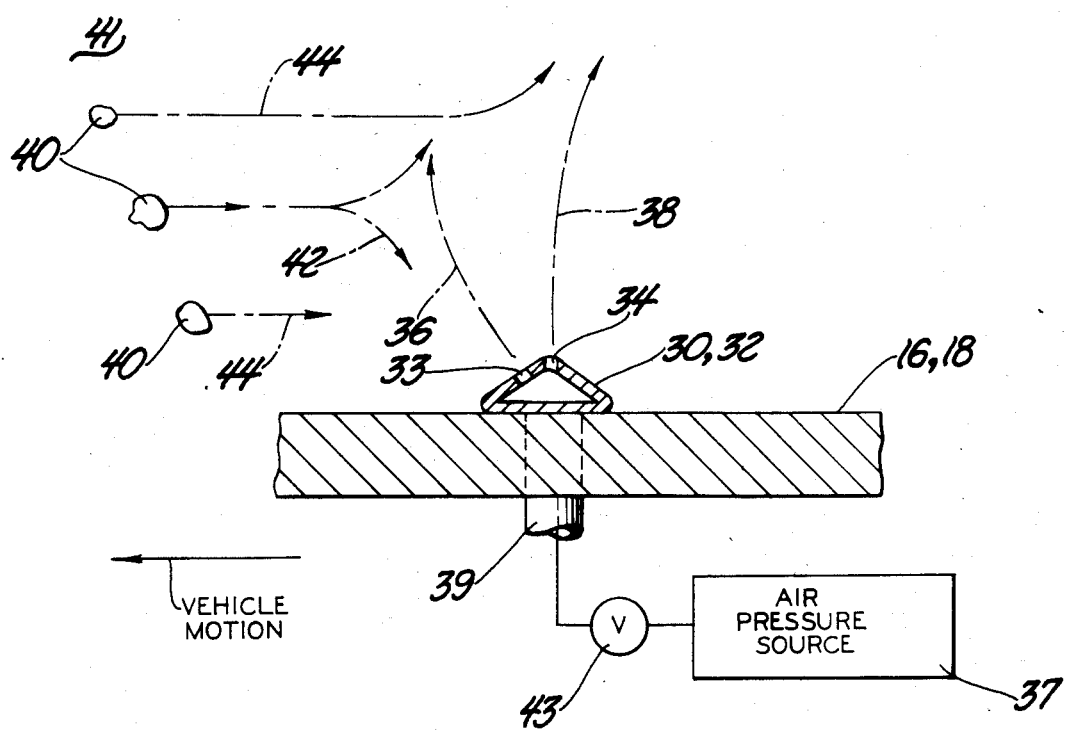
FIG. 5 is an enlarged fragmentary sectional view on line 5—5 in FIG. 2.

My invention is particularly concerned with two tube-like manifold structures designated by numerals 30 and 32 in the drawings. Each manifold structure is designed to generate an upflowing gas curtain in the area directly in front of observation windows 28. The gas curtains are indicated in FIGS. 2 and 5 by arrows 36 and 38. The purpose of each gas curtain is to deflect airborne particulates in forward zone 41 from impinging on the surfaces of windows 28 when the vehicle is moving in a right-to-left direction (FIG. 2).

As seen in FIG. 5, a representative manifold structure 30 or 32 has a hollow triangular cross section. The cross sectional configuration has no significance as regards gas-curtain performance. However, the triangular shape of the tube gives it a relatively high resistance to mechanical deformation. Therefore when the tube is affixed to the upper surface 16 (or 18) of the hull it is not likely to be deformed or broken when soldiers step on it while entering or leaving the vehicle.

Pressurized gas is supplied to each manifold tube from any suitable pressure source 37 on board the vehicle. An on-off valve 43 may be utilized in the pressure supply conduit 39 to deactivate the system when it is not needed. Pressure source 37 can be an air compressor or perhaps a pressure takeoff from the engine exhaust, or a power bleed off from the engine supercharger.

As shown in FIG. 5, the upper exposed wall area of each manifold tube 30 or 32 has two sets of nozzle openings 33 and 34 therein. In FIG. 3 the nozzle openings in tube 30 take the form of slots, designated by short dash lines; the nozzle openings in tube 32 take the form of circular openings, designated by spaced dots. Either elongated slots or circular holes may be used. Whichever nozzle configuration is used, the nozzle openings should be sufficiently close together that the discrete gas jets collectively form a substantially continuous upflowing gas curtain.

FIG. 5 indicates the use of two rows of nozzle openings (33 and 34) in a given manifold tube. Such an arrangement will provide two gas curtains, as designated by numerals 36 and 38. It may not be necessary to provide two gas curtains; one curtain may be sufficient. One possible advantage of two gas curtains is that the leading curtain may act to shield the trailing curtain from the disturbing effects of the stagnant air mass in the path of the vehicle.

Gas curtains 36 may be angled slightly in a forward direction to somewhat oppose the stagnant air mass designated by numeral 44 (FIG. 5). In this sense it will be appreciated that when the vehicle is moving the respective manifold tube 30 (or 32) is moving into the stagnant air mass; arrow 44 represents the relative motion of the stagnant air mass and airborne particulates, vis a vis the forwardly travelling gas curtains 36 and 38.

Gas curtains 36 and 38 are shown as essentially straight planar curtains. However, since the manifold tube is in motion each gas curtain will bend rearwardly in an absolute sense. The extent of the bend will depend on the gas jet velocity and vehicle speed.

As gas curtain 36 strikes the stagnant air-particle system some deflection of the gas curtain will take place. Hopefully, airborne particles will be assimilated into the gas curtain and carried upwardly out of alignment with observation windows 28 (FIG. 2). The intent is to deflect the stagnant airborne particles so that the zone behind the gas curtains is relatively free of airborne particulates.

Hopefully gas curtain 36 will act to partially deflect airborne particulates before those particulates encounter gas curtain 38. Curtain 38 will reinforce and enhance the deflection process.

It will be seen from FIG. 3 that each manifold tube, 30 or 32, has a V-shaped configuration, i.e., when looking downwardly on the hull surface. The v-shaped configuration is believed advantageous in tending to deflect airborne particulates laterally away from the path taken by observation windows 28. The lateral deflection produced by the V configuration augments the upward deflection provided by the upflowing gas curtain(s). Airborne particulates would probably be deflected obliquely, i.e., upwardly and laterally.

The spacing of manifold tubes 30 and 32 from the observation windows is dictated by various factors, including the sizes of the windows, anticipated vehicle speed range, and space availability factors. In the FIG. 3 arrangement the observation windows are located on a movable hatch cover. The manifold tubes are mounted on the hull, instead of on the cover, in order to avoid having to use a flexible hose and complicated internal piping for transporting the pressurized gas into the cover. In this case the manifold tubes are thus some distance away from the observation windows.

It is believed that if the manifold tubes are located immediately next to the observation windows the airborne particulates may not be fully deflected out of the path of the windows; instead some of the particulates may reach the windows. To the extent that such particles are of a semi-fluid viscous nature they may adhere to the window surface even in the presence of the gas curtains. On the other hand, if the gas curtains are located a great distance from the window surfaces they may not be fully effective in that deflected particles might collapse back into the oncoming path of the windows. Exact spacing of the manifold tubes from the window surfaces will need to be determined by trial-and-error procedures. A spacing in the range of one foot to three feet is believed to be appropriate.

The desired gas curtain is designed primarily for use on sticky semi-fluid particles of a small particle size that tend to remain airborne; such particles can be deflected with moderate gas jet forces. The gas curtain system may not be fully effective on heavier mud masses that would likely penetrate the curtain.

It is believed that the described gas curtain system would be effective on lightly falling snow or on airborne dust, or an lightly falling rain (small particle sizes). It would probably not be effective on hard driving rain.

The system is visualized as a low cost add on system that can be used as an alternative to costly windshield wiper systems. The proposed system could probably be used in some areas on a vehicle where installation problems would preclude the use of windshield wiper systems.

FIG. 3 of the drawings shows two manifolds 30 and 32 for generating a series of pressurized gas curtains between the particle-laden atmosphere and the vehicle observation windows(s). In a given situation only one manifold might be necessary. The second manifold (30) could in that case by omitted.

I wish it to be understood that I do not desire to be limited to the exact details of construction shown and described for obvious modifications will occur to a person skilled in the art, without departing from the spirit and scope of the appended claims.

I claim:

1. In a military tracked vehicle comprising a hull having a longitudinal axis; said hull including an upper wall having a hatch opening therein enabling a human driver to enter or leave the vehicle, a movable cover for the hatch opening, and a number of vision blocks mounted in the cover for enabling the human driver to view the terrain in the forward path of the vehicle; said hatch opening and associated cover being offset laterally from the vehicle's longitudinal axis, so that when the vehicle is moving in a forward direction airborne particulates generated by one of the vehicle tracks tend to be concentrated in zones in the path taken by the hatch cover; at least some of the vision blocks having external surfaces thereof facing in a forward direction, whereby there is a danger that airborne particulates in the path of the vehicle will impinge on external surfaces of the vision blocks: the improvement comprising means for preventing airborne particulates from impinging on the vision block surfaces while the vehicle is moving in the forward direction; said prevention means comprising a tube-like manifold secured to the hull upper wall in an area thereof directly forward from the hatch cover; said manifold having a V-shaped configuration when looking downwardly onto the hull surface; a gas pressure source within the vehicle, conduit means extending between the gas pressure source and the tube-like manifold for supplying pressurized gas to the manifold; a series of gas discharge nozzle openings extending along the manifold for discharging pressurized gas upwardly away from the hull surface; said nozzle openings being sufficiently close together that the discharged gas forms a substantially continuous pressurized gas curtain in the space forwardly of the aforementioned vision blocks; said gas curtain being operable to apply upwardly-acting forces on particulates encountered by the curtain; said V-shaped manifold having a length, measured normal to the hull longitudinal axis, that is approximately the same as the lateral dimension of the hatch cover, whereby the pressurized gas curtain has sufficient length to substantially completely shield the vision blocks from airborne particulates; said tube-like manifold being physically engaged by an upper exposed face of the hull such that it is not likely to be deformed or broken should a soldier step thereon when entering or leaving the vehicle through the hatch opening; said manifold being spaced forwardly from the hatch cover by a distance that is greater than one foot and less than three feet, whereby there is sufficient space between the gas curtain and vision block surfaces so that deflected particulates have enough time to escape from the path taken by the vision blocks; the V-shaped configuration of the manifold being such that the gas curtain exerts lateral force components on the encountered particulates.

* * * * *